(12) United States Patent
Thibeault et al.

(10) Patent No.: US 9,349,092 B2
(45) Date of Patent: May 24, 2016

(54) NEURAL NETWORK FOR REINFORCEMENT LEARNING

(71) Applicant: HRL LABORATORIES LLC, Malibu, CA (US)

(72) Inventors: Corey M. Thibeault, Valley Village, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/293,928

(22) Filed: Jun. 2, 2014

(65) Prior Publication Data

US 2014/0344202 A1    Nov. 20, 2014

Related U.S. Application Data

(63) Continuation of application No. PCT/US2013/041451, filed on May 16, 2013, and a continuation of application No. 13/896,110, filed on May 16, 2013, now abandoned.

(60) Provisional application No. 61/732,590, filed on Dec. 3, 2012.

(51) Int. Cl.
*G06N 3/08* (2006.01)
*G06N 3/04* (2006.01)
*G06N 99/00* (2010.01)

(52) U.S. Cl.
CPC .................. *G06N 3/08* (2013.01); *G06N 3/049* (2013.01); *G06N 99/005* (2013.01)

(58) Field of Classification Search
CPC ........... G06N 3/08; G06N 3/008; G06N 3/02; G06N 3/049; G06N 99/005
USPC ................................................ 706/21, 25–26
See application file for complete search history.

(56) References Cited

U.S. PATENT DOCUMENTS

| 8,260,441 B2 | 9/2012 | Schneegass et al. |
| 2010/0217145 A1 | 8/2010 | Buscema |
| 2011/0161268 A1 | 6/2011 | Nugent |

(Continued)

OTHER PUBLICATIONS

Xie X. et al., "Learning in neural networks by reinforcement of irregular spiking", Physical Review, E 69, 041909, 2004.*

(Continued)

*Primary Examiner* — Stanley K Hill
*Assistant Examiner* — Dave Misir
(74) *Attorney, Agent, or Firm* — Ladas & Parry

(57) ABSTRACT

A neural model for reinforcement-learning and for action-selection includes a plurality of channels, a population of input neurons in each of the channels, a population of output neurons in each of the channels, each population of input neurons in each of the channels coupled to each population of output neurons in each of the channels, and a population of reward neurons in each of the channels. Each channel of a population of reward neurons receives input from an environmental input, and is coupled only to output neurons in a channel that the reward neuron is part of. If the environmental input for a channel is positive, the corresponding channel of a population of output neurons are rewarded and have their responses reinforced, otherwise the corresponding channel of a population of output neurons are punished and have their responses attenuated.

24 Claims, 16 Drawing Sheets

(56) References Cited

U.S. PATENT DOCUMENTS

2013/0325776 A1* 12/2013 Ponulak et al. .................. 706/25
2014/0025613 A1* 1/2014 Ponulak .......................... 706/25

OTHER PUBLICATIONS

Schemmel J. et al., "Implementing Synaptic Plasticity in a VLSI Spiking Neural Network Model", 2006 International Joint Conference on Neural Networks, Sheraton Vancouver Wall Centre Hotel, Vancouver, BC, Canada, Jul. 16-21, 2006.*

Thibeault C. et al., "Embodied Modeling With Spiking Neural Networks for Neuromorphic Hardware: A Simulation Study", CAINE, Sep. 2013. (Date precludes usage).*

Thibeault C. et al., "Using Games to Embody Spiking Neural Networks for Neuromorphic Hardware", IJCA, vol. 21, No. 1, Mar. 2014. (Date precludes usage).*

Sridharan D. et al., "The Role of the Basal Ganglia in Exploration in a Neural Model Based on Reinforcement Learning", International Journal of Neural Systems, vol. 16, No. 2, Apr. 2006, pp. 111-124.*

Barr, David R.W. et al., "Implementation of multi-layer leaky integrator networks on a cellular processor array," International Joint Conference on Neural Networks, pp. 1560-1565, (Aug. 12-17, 2007).

Merolla, Paul et al., "A Digital Neurosynaptic Core Using Embedded Crossbar Memory with 45pJ per Spike at 45 nm." Custom Integrated Conference (CICC), 2011 IEE, pp. 1-4, (Sep. 19-21, 2011).

Song, S., K. D. Miller, and L.F. Abbott, "Competitive Hebbian Learning through Spike-timing Dependent Synaptic Plasticity", *Nature Neuroscience* (9), pp. 919-926, (2000).

Dahaene, Stanislas et al., "Reward-dependent learning in neuronal networks for planning and decision making." Progress in Brain Research, vol. 126, pp. 217-229, (2000).

International Search Report and Written Opinion for PCT/US2013/041451.

U.S. Appl. No. 13/896,110, filed May 16, 2013, Thibeault et al.

From U.S. Appl. No. 13/896,110 (Unpublished, Non Publication Requested), Non-Final Rejection mailed on Aug. 19, 2015.

International Preliminary Report on Patentability (IPRP) Chapter I for PCT/US2013/041451 dated Jun. 9, 2015.

* cited by examiner

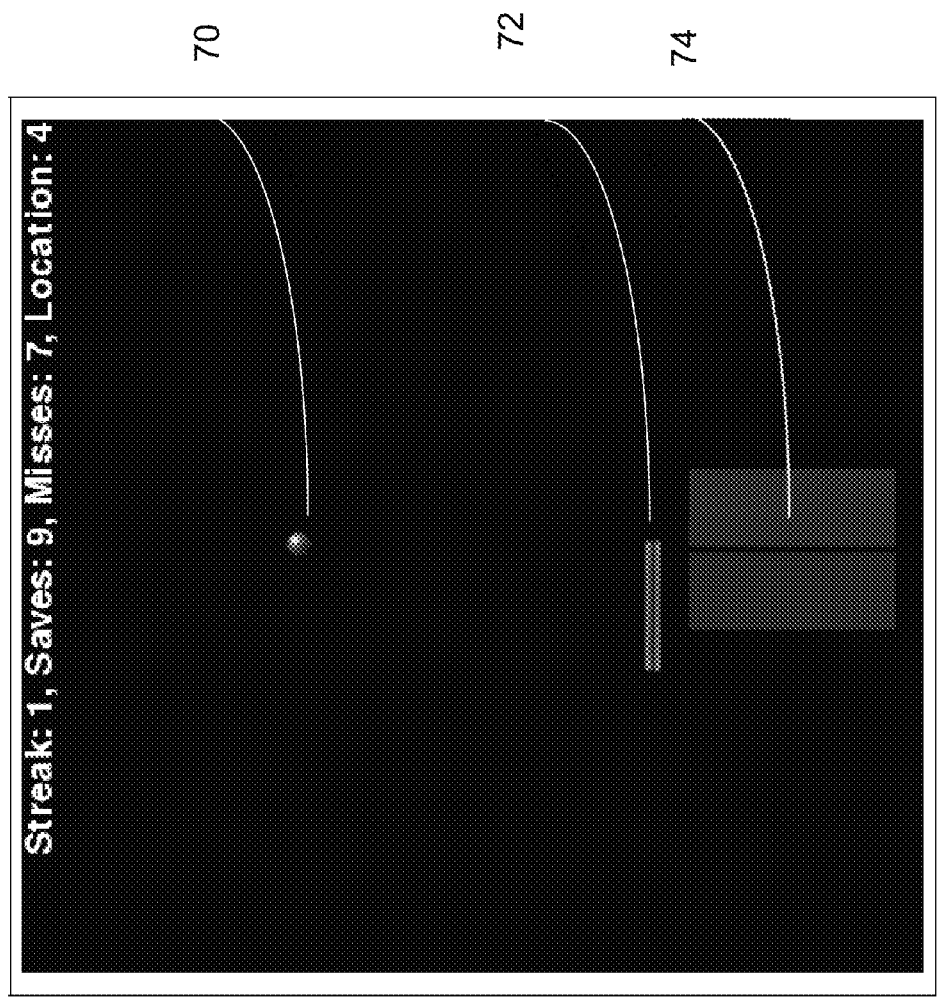

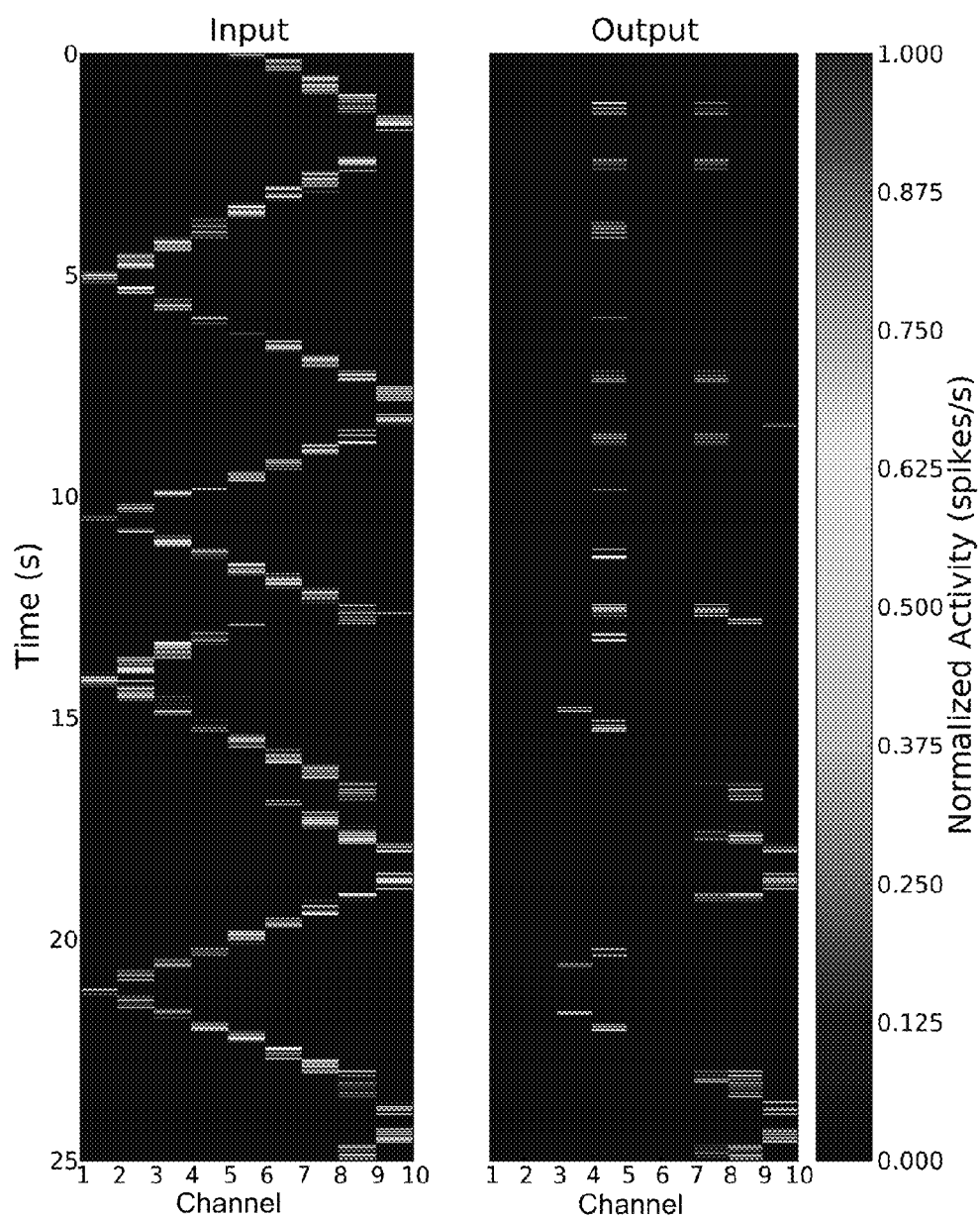
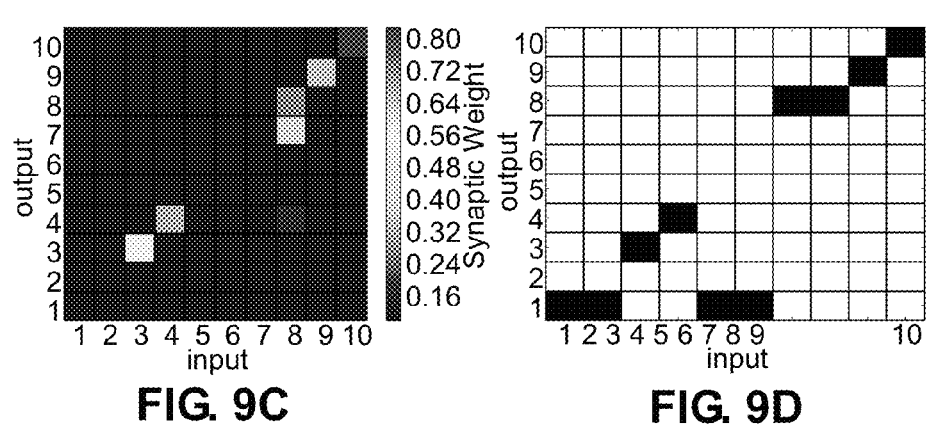
FIG. 9A  FIG. 9B  FIG. 9C  FIG. 9D

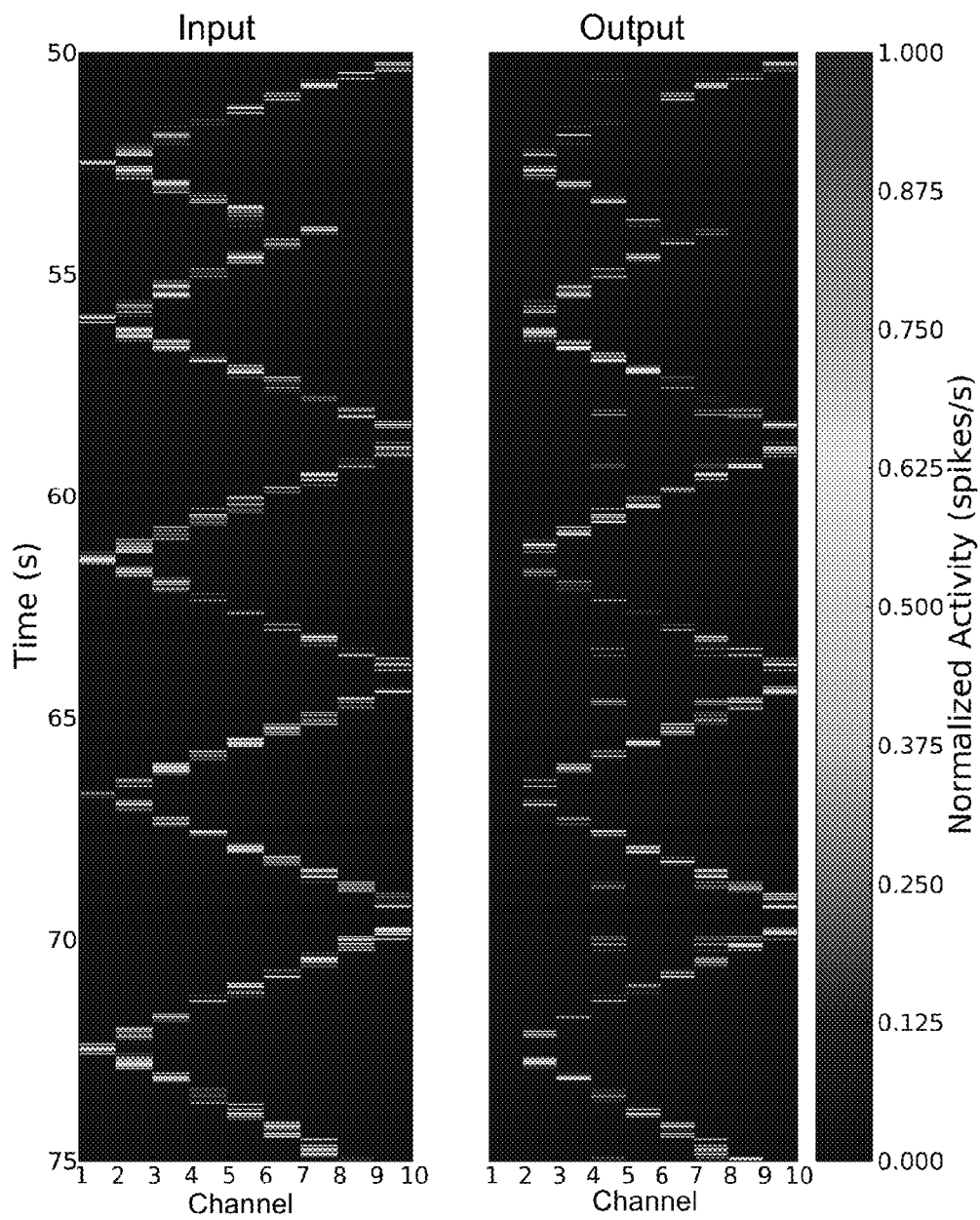
FIG. 9E
FIG. 9F
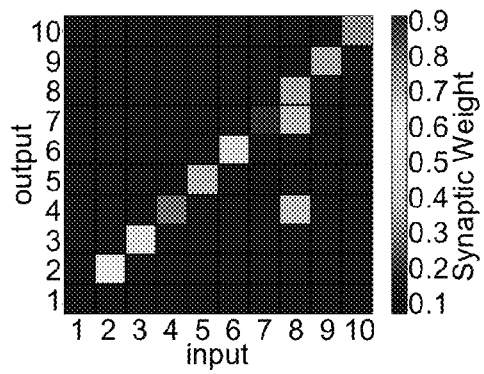
FIG. 9G
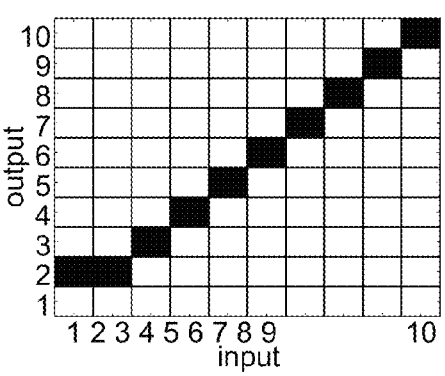
FIG. 9H

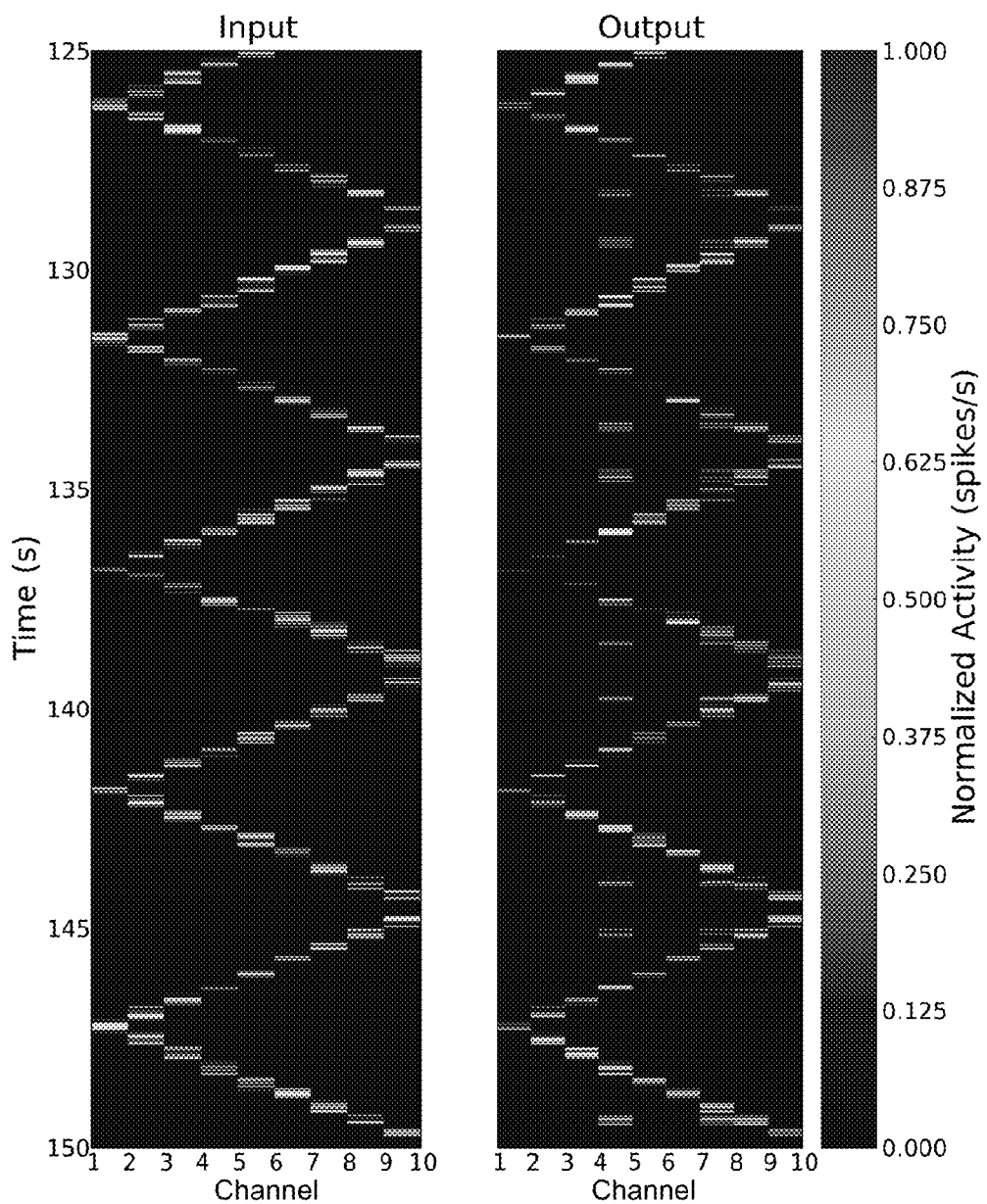
FIG. 9I  FIG. 9J
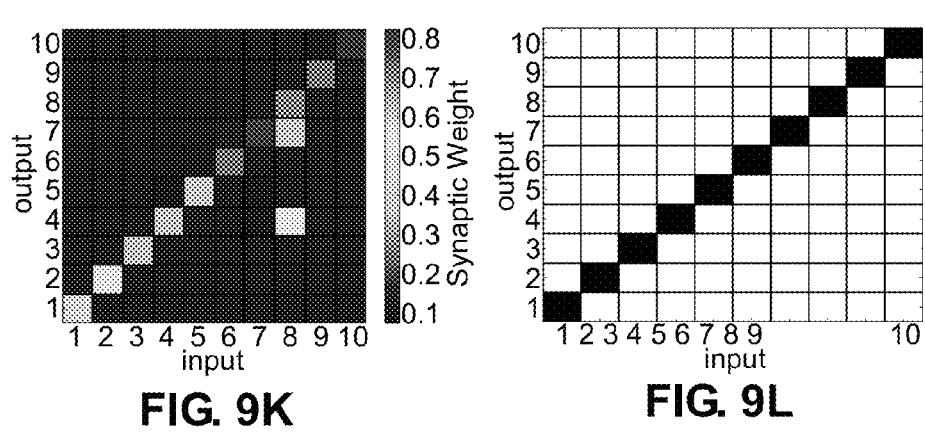
FIG. 9K  FIG. 9L

NEURAL NETWORK FOR REINFORCEMENT LEARNING

CROSS REFERENCE TO RELATED APPLICATIONS

The present application is a continuation of International Patent Application No. PCT/US2013/041451 filed on May 16, 2013, which is related to and claims priority to U.S. Provisional Patent Application Ser. No. 61/732,590 filed on Dec. 3, 2012, and to U.S. Non-Provisional patent application Ser. No. 13/896,110 filed on May 16, 2013 which claims priority to U.S. Provisional Patent Application Ser. No. 61/732,590 filed on Dec. 3, 2012, all of which are hereby incorporated by reference in their entireties.

STATEMENT REGARDING FEDERAL FUNDING

This invention was made under U.S. Government contract DARPA SyNAPSE HR0011-09-C-0001. The U.S. Government has certain rights in this invention.

TECHNICAL FIELD

This disclosure relates to neural networks, and in particular to neural networks capable of action-selection and reinforcement-learning. The technology here disclosed involves plastic action-selection networks for neuromorphic hardware.

BACKGROUND

In the prior art, neural networks capable of action-selection have been well characterized, as have those that demonstrate reinforcement-learning. However, in the prior art, action-selection and reinforcement-learning algorithms present complex solutions to the distal reward problem, which are not easily amenable to hardware implementations.

Barr, D., P. Dudek, J. Chambers, and K. Gurney describe in "Implementation of multi-layer leaky integrator networks on a cellular processor array" *Neural Networks,* 2007. *IJCNN August* 2007. *International Joint Conference, pp.* 1560-1565, a model of the basal ganglia on a neural processor array. The software neural model was capable of performing action selection. However, Barr et al. did not describe any inherent mechanisms for reinforcement-learning and the micro-channels of the basal ganglia were predefined.

Merolla, P., J. Arthur, F. Akopyan, N. Imam, R. Manohar, and D. Modha describe in "A digital neurosynaptic core using embedded crossbar memory with 45 pj per spike in 45 nm" *Custom Integrated Circuits Conference (CICC), September* 2011 *IEEE,* pp. 1-4, a neuromorphic processor capable of playing a game of pong against a human opponent. However, the network was constructed off-line and once programmed on the hardware, remained static.

What is needed is a neural network that implements action-selection and reinforcement-learning and that can be more readily implemented with hardware. The embodiments of the present disclosure answer these and other needs.

SUMMARY

In a first embodiment disclosed herein, a neural network for reinforcement-learning and for action-selection comprises a plurality of channels, a population of input neurons in each of the channels, a population of output neurons in each of the channels, each population of input neurons in each of the channels coupled to each population of output neurons in each of the channels and a population of reward neurons in each of the channels, wherein each population of reward neurons receives input from an environmental input, and wherein each channel of reward neurons is coupled only to output neurons in a channel that the reward neuron is part of, wherein if the environmental input for a channel is positive, the corresponding channel of a population of output neurons are rewarded and have their responses reinforced, and wherein if the environmental input for a channel is negative, the corresponding channel of a population of output neurons are punished and have their responses attenuated.

In another embodiment disclosed herein, a neural network for reinforcement-learning and for action-selection comprises a plurality of channels, a population of input neurons in each of the channels, a population of output neurons in each of the channels, each population of input neurons in each of the channels coupled to each population of output neurons in each of the channels, a population of reward neurons in each of the channels, wherein each population of reward neurons receives input from an environmental input, and wherein each channel of reward neurons is coupled only to output neurons in a channel that the reward neuron is part of, and a population of inhibition neurons in each of the channels, wherein each population of inhibition neurons receive an input from a population of output neurons in a same channel that the population of inhibition neurons is part of, and wherein a population of inhibition neurons in a channel has an output to output neurons in every other channel except the channel of which the inhibition neurons are part of, wherein if the environmental input to a population of reward neurons for a channel is positive, the corresponding channel of a population of output neurons are rewarded and have their responses reinforced, and wherein if the environmental input to a population of reward neurons for a channel is negative, the corresponding channel of a population of output neurons are punished and have their responses attenuated.

In yet another embodiment disclosed herein, a basal ganglia neural network comprises a plurality of channels, a population of cortex neurons in each of the channels, a population of striatum neurons in each of the channels, each population of striatum neurons in each of the channels coupled to each population of cortex neurons in each of the channels, a population of reward neurons in each of the channels, wherein each population of reward neurons receives input from an environmental input, and wherein each channel of reward neurons is coupled only to striatum neurons in a channel that the reward neuron is part of, and a population of Substantia Nigra pars reticulata (SNr) neurons in each of the channels, wherein each population of SNr neurons is coupled only to a population of striatum neurons in a channel that the SNr neurons are part of, wherein if the environmental input to a population of reward neurons for a channel is positive, the corresponding channel of a population of striatum neurons are rewarded and have their responses reinforced, wherein if the environmental input to a population of reward neurons for a channel is negative, the corresponding channel of a population of striatum neurons are punished and have their responses attenuated, and wherein each population of SNr neurons is tonically active and is suppressed by inhibitory afferents of striatum neurons in a channel that the SNr neurons are part of.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 6 is a diagram showing a pong style virtual environment in accordance with the present disclosure;

FIGS. 7A, 7B and 7C, 8A, 8B and 8C, and 9A, 9B, 9C, 9D, 9E, 9F, 9G, 9H, 9I, 9J, 9K and 9L illustrate results for the pong style virtual environment of FIG. 6 for different spatial widths and time spans in accordance with the present disclosure.

DETAILED DESCRIPTION

Figure 1:
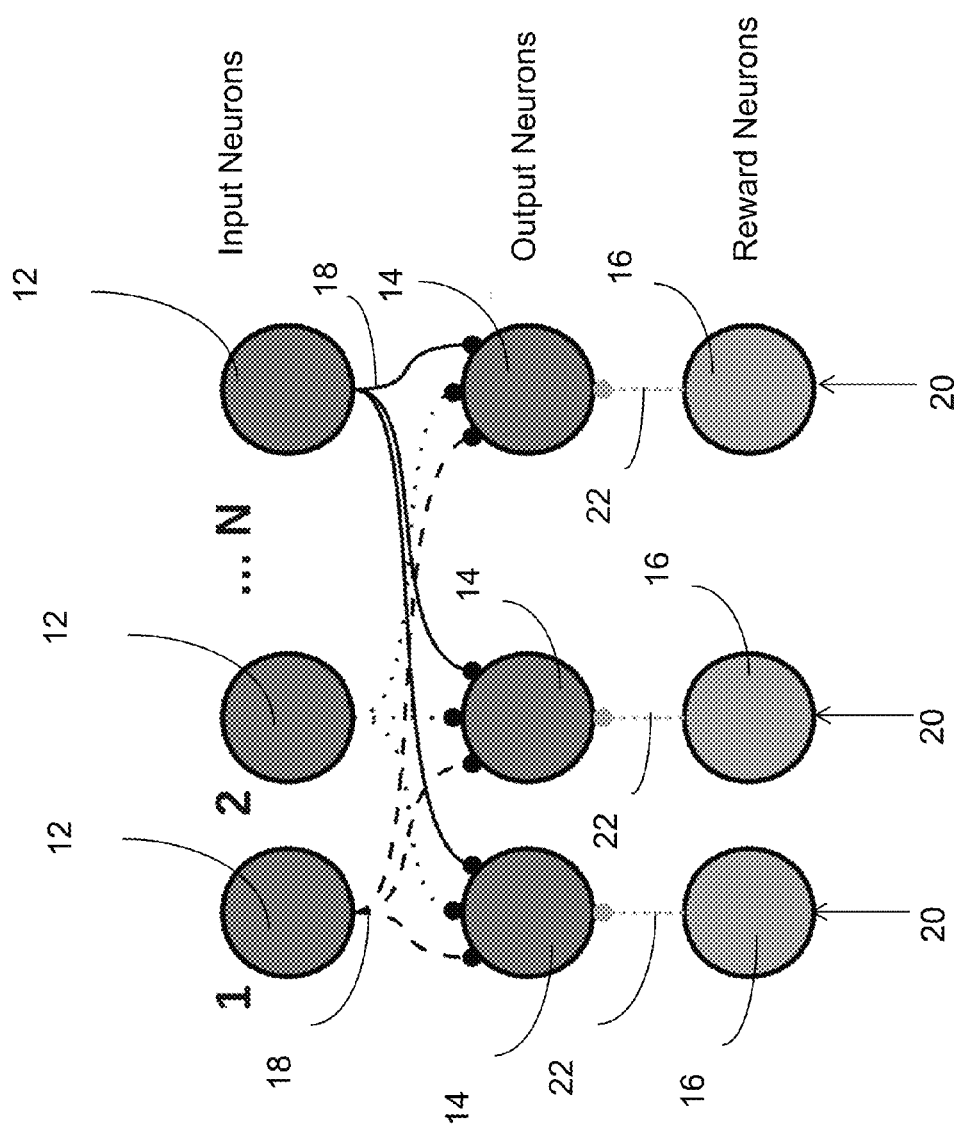
FIG. 1 shows a neural network in accordance with the present disclosure.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The combination of action-selection and reinforcement-learning in biological entities is essential for successfully adapting and thriving in any environment. This is also true for the successful operation of intelligent agents. Presented here are the design and implementation of biologically inspired action selection/reinforcement-networks for the control of an agent by a neuromorphic processor.

The embodied modeling can be described as the coupling of computational biology and engineering. Historically strategies for embedding artificial intelligence have failed to result in agents with truly emergent properties. Because of this it is still unreasonable to deploy a robotic entity and expect it to learn from its environment the way biological entities can. Similarly, neural models require complex and varied input signals in order to accurately replicate the activity observed in vivo. One method for creating these complex stimuli is through immersing a model in a real or virtual environment capable of providing feedback.

Conceptually, action selection is the arbitration of competing signals. In the mammalian nervous system the complex circuitry of the basal ganglia (BG) is active in gating the information flow in the frontal cortex by appropriately selecting between input signals. This selection mechanism can affect simple action all the way up to complex behaviors and cognitive processing. Although overly simplified, it can be helpful to relate the BG to a circuit multiplexer that actively connecting inputs to outputs based on the current system state.

Reinforcement or reward learning (RL) is the reinforcement of actions or decisions that maximizes the positive outcome of those choices. This is similar to instrumental conditioning where stimulus response trials result in reinforcement of responses that are rewarded and attenuation of those that are not. Reinforcement-learning in a neural network is an ideal alternative to supervised learning algorithms. Where supervised learning requires an intelligent teaching signal that must have a detailed understanding of the task, reinforcement learning can develop independent of the task without any prior knowledge. Only the quality of the output signal in response to the input signal and current contextual state of the network is needed.

In an embodiment according to the present disclosure, neurons within a neural network may be modeled by a Leaky-Integrate and Fire (LIF) model. The LIF model is defined by equation 1.

$$C_m \frac{dV}{dt} = -g_{leak}(V - E_{rest}) + I. \quad (1)$$

where

Cm is the membrane capacitance,

I is the sum of external and synaptic currents, gleak is the conductance of the leak channels, and Erest is the reversal potential for that particular class of synapse.

As the current input into the model neuron is increased the membrane voltage will proportionally increase until a threshold voltage is reached. At this point an action potential is fired and the membrane voltage is reset to the resting value. The neuron model is placed in a refractory period for 2 milliseconds where no changes in membrane voltages are allowed. If the current is removed before reaching the threshold, the voltage will decay to Erest. The LIF model is one of the least computationally intensive neural models but is still capable of replicating many aspects of neural activity.

The connections between neurons or synapses are modeled by conductance-based synapses. The general form of that influence is defined as equation 2.

$$g_{syn} = g_{max} g_{eff}(V - E_{syn}). \quad (2)$$

where gmax is the maximum conductance for that particular class of synapse, geff is the current synaptic efficacy between [0, geffmax], and Esyn is the reversal potential for that particular class of synapse.

To simulate the buffering and re-uptake of neurotransmitters, the influence that a presynaptic action potential has on a neuron can be decayed based on a specified time constant. This process is abstracted using equation 3.

$$\tau_{syn} \frac{dg_i^{syn}}{dt} = -g_i^{syn} + \sum W_{ji} \delta(t - t_j). \quad (3)$$

Learning at the synaptic level is achieved through the spike-timing dependent plasticity rules described in Song, S., K. D. Miller, and L. F. Abbott (2000), "Competitive Hebbian Learning through Spike-timing Dependent Synaptic Plasticity" Nature Neuroscience (9) 2000, pp. 919-926, as shown in equation 4.

$$g_{eff} \rightarrow g_{eff} + g_{effmax} F(\Delta t) \quad (4)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

-continued if $(g_{\text{eff}} < 0)$ then $g_{\text{eff}} \to 0$ if $(g\text{eff} > g\text{effmax})$ then $g\text{eff} \to g\text{effmax}$ The global parameter values that may be used in one embodiment are presented in Table 1. The governing equations are numerically integrated using Euler integration with a 1 milliseconds (ms) time step.

TABLE 1

Global model parameters.

| Parameter | Value |
|---|---|
| $C_m$ | 1. (pF) |
| $\tau_{ge}$ | 5. (ms) |
| $\tau_{gi}$ | 100. (ms) |
| $E_{exc}$ | 0. (mV) |
| $E_{inh}$ | −80. (mV) |
| $V_{rest}$ | 0. (mV) |
| $A_+$ | 0.025 |
| $A_-$ | 0.026 |
| $\tau_+$ | 20. (ms) |
| $\tau_-$ | 20. (ms) |

Figure 2:
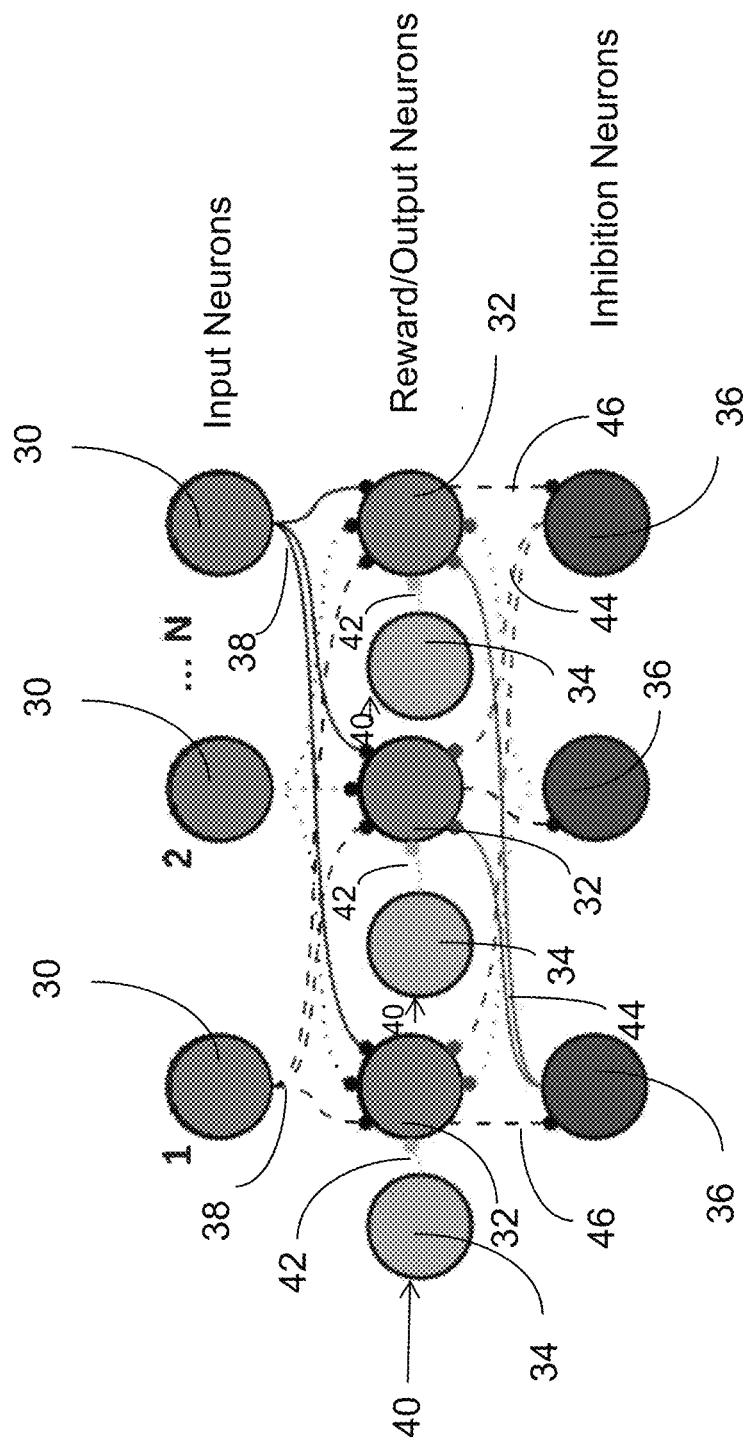
FIG. 2 shows another neural network with lateral inhibition in accordance with the present disclosure.
Figure 3:
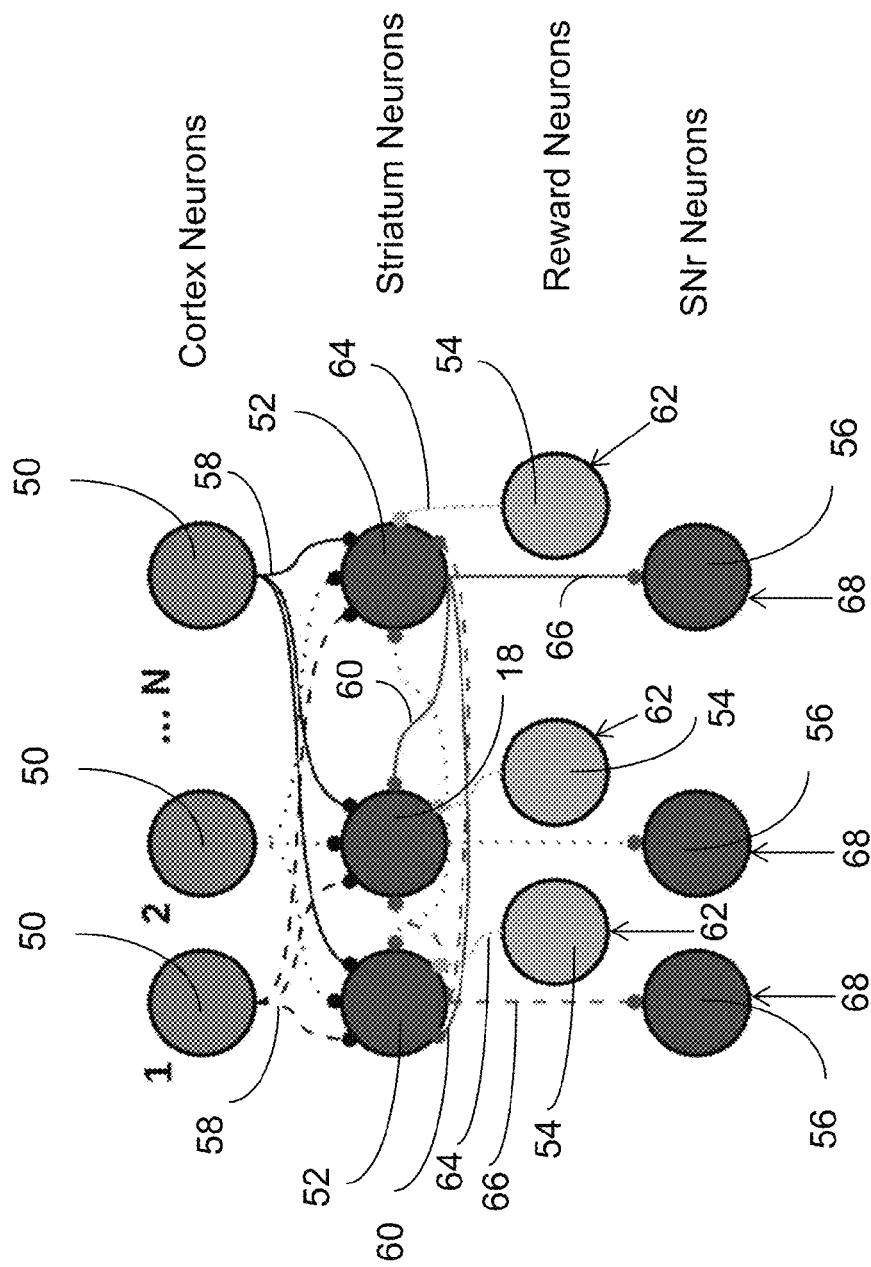
FIG. 3 shows a basal ganglia neural network in accordance with the present disclosure.

FIGS. 1 to 3 show three different neural network embodiments. Initially, each of these networks has no knowledge or inherent understanding of their environment. The behavior is learned through feedback from the environment in the form of reward and punishment signals encoded as either random or structured spike events. These signals strengthen or weaken the synaptic connections between neurons; reinforcing the appropriate action.

The first model, shown in FIG. 1, is a simple feed-forward network that consists entirely of excitatory neurons arranged into N channels. The neural network of FIG. 1 has N channels. Each of the N channels has a population of input neurons 12, a population of output neurons 14, and a population of reward neurons 16.

In one embodiment the populations of input neurons 12 are connected with equal probability and equal conductance to all of the populations of output neurons 14, ensuring that there is no inherent bias to a particular input-output pair. In another embodiment, the populations of input neurons 12 are connected randomly to the populations of output neurons 14. This embodiment is particularly important to large-scale implementations of these networks as well as afferent limitations imposed by a neuromorphic architecture.

Each channel of a population of input neurons 12 is connected to each channel of a population of output neurons 14 channel by synapses 18. One set of parameters that may be used with the model of FIG. 1 is presented in Table 2. The synapse connections 18 between input neurons 12 and output neurons 14 are randomly created from the entire input neuron 12 population to ensure that there is no bias between input and output channels.

Reward neurons 16 receive input from environmental inputs 20, which may be sensed from the environment. Each channel of reward neurons is coupled to only one corresponding channel of output neurons 20 via synapses 22. If the environmental inputs for a channel are positive, the corresponding channel of output neurons 14 are rewarded and have their responses reinforced. If the environmental inputs for a channel are negative, the corresponding channel output neurons 14 are punished and have their responses attenuated.

The input neurons 12, the output neurons 14 and the reward neurons 16 may be modeled by the Leaky-Integrate and Fire (LIF) model defined by equation 1. The synapses 18 and 22 may be modeled by the spike-timing dependent plasticity (STDP) of equation 4.

TABLE 2

Parameters for the excitatory only network.

A. Neuron parameters

| Neural Region | Neurons Per Channel |
|---|---|
| Input | 3 |
| Output | 3 |
| Reward | 1 |

B. Connections

| Source → Destination | Synaptic Conductance $(g_{max}) \cdot (g_{\text{eff}})$ | Number of Incoming Connections (total) |
|---|---|---|
| Input → Output | (10.0) · (0.25) | 15 |
| Reward → Input | (10.0) · (1.0) | 1 |

FIG. 2 shows another neural network with lateral inhibition between the output populations in accordance with the present disclosure. The neural network of FIG. 2 creates an on-center off-surround network where the most active population suppresses the other output populations. Not only is this a more biologically realistic network but it also offers more control in the selection process. One set of parameters for this model may be the parameters shown in Table 3. A key aspect of the neural network is the diffuse connections of the inhibition neurons 36. Each channel of a population of inhibition neurons 36 project to every other channel of output neurons 32, excluding the channel of which the population of inhibition neurons 36 are a part of.

The neural network of FIG. 2 has N channels. Each of the N channels has a population of input neurons 30, a population of output neurons 32, a population of reward neurons 34, and a population of inhibition neurons 36. Each channel of a population of input neurons 30 is connected to each channel of a population of output neurons 32 channel by synapses 38.

In one embodiment the populations of input neurons 30 are connected with equal probability and equal conductance to all of the populations of output neurons 32, ensuring that there is no inherent bias to a particular input-output pair. In another embodiment, the synapse connections 38 between the populations of input neurons 30 and the populations of output neurons 32 are connected randomly from the entire population of input neurons 30.

Each channel of a population of reward neurons 34 receives inputs from environmental inputs 40, which may be sensed from the environment. Each channel of a population of reward neurons 34 is coupled to only one corresponding channel of a population of output neurons 32 via synapses 42. If the environmental inputs for a channel are positive, the corresponding channel of output neurons 32 are rewarded and have their responses reinforced. If the environmental inputs for a channel are negative, the corresponding channel output neurons 32 are punished and have their responses attenuated.

Each channel of a population of output neurons 32 are connected by synapses 46 to a corresponding channel of a population of inhibition neurons 36. The inhibition neurons 36 in a channel are coupled via synapses 44 to output neurons 32 in every other channel; however the inhibition neurons 36 in a channel are not coupled to output neurons 32 of the channel of which the inhibition neurons 36 are part of.

As the responses from the output neurons 32 of a channel of which the inhibition neurons 36 are part of increase, the inhibition neurons 36 may via the synapses 44 inhibit the responses from output neurons 32 in every other channel.

The input neurons 30, the output neurons 32, the reward neurons 34, and the inhibition neurons 36 may be modeled by the Leaky-Integrate and Fire (LIF) model defined by equation 1. The synapses 38, 42, 44 and 46 may be modeled by the spike-timing dependent plasticity (STDP) of equation 4.

TABLE 3

Parameters for the lateral-inhibition network.

A. Neuron parameters

| Neural Region | Neurons Per Channel |
|---|---|
| Input | 3 |
| Output | 3 |
| Inhibition | 3 |
| Reward | 1 |

B. Connections

| Source → Destination | Synaptic Conductance $(g_{max}) \cdot (g_{eff})$ | Number of Incoming Connections (total) |
|---|---|---|
| Input → Output | (10.0) · (0.25) | 15 |
| Output → Inhibition | (10.0) · (1.0) | 15 |
| Inhibition → Output | (10.0) · (1.0) | 15 |
| Reward → Input | (10.0) · (1.0) | 1 |

FIG. 3 shows a basal ganglia (BG) neural network in accordance with the present disclosure. The neural network of FIG. 3 emulates the physiological activity of the BG direct pathway, where the Substantia Nigra pars reticulata (SNr) neurons 56 are tonically active, firing around 30 Hz. The substantia nigra is part of the basal ganglia and the pars reticulata is part of the substantia nigra. The basal activity of the SNr neurons 56 is suppressed by the inhibitory afferents of the striatum neurons 52, resulting in a disinhibitory mechanism of action. Learning occurs between the cortex neurons 50 and the striatum neurons 52 to develop the appropriate input-output channel combinations. One set of parameters that may be use this model are shown in Table 4.

TABLE 4

Parameters for the basal ganglia direct pathway.

A. Neuron parameters

| Neural Region | Neurons Per Channel |
|---|---|
| Cortex (Ctx) | 4 |
| Striatum (Str) | 3 |
| Substantia Nigra pars reticulata (SNr) | 3 |
| Excitatory | 9 |
| Reward | 6 |

TABLE 4-continued

Parameters for the basal ganglia direct pathway.

B. Connections

| Source → Destination | Synaptic Conductance | Number of Incoming Connections (per channel) |
|---|---|---|
| Ctx → Str | 0.1 | 4 |
| Str → Str (diffuse) | 10.0 | 3 |
| Excitatory → SNr | 0.08 | 3 |
| Str → SNr | 10.0 | 3 |
| Reward → Str | 10.0 | 6 |

Physiologically, the SNr neurons 54 are tonically active. However, the LIF neuron of equation 1 is not capable of replicating that spontaneous activity. To compensate, a Poisson random excitatory input 68 is injected into the SNr neuron populations 56. In addition, low-level uniform random noise may be injected into the network.

The neural network of FIG. 3 has N channels. Each of the N channels has a population of cortex neurons 50, a population of striatum neurons 52, a population of reward neurons 54, and a population of SNr neurons 56. Each channel of cortex neurons 50 is connected to each striatum neuron channel by synapses 58.

In one embodiment the populations of cortex neurons 50 are connected with equal probability and equal conductance to all of the populations of striatum neurons 52, ensuring that there is no inherent bias to a particular cortex-striatum pair. In another embodiment, the populations of cortex neurons 50 are connected randomly to the populations of striatum neurons 52.

The population of striatum neurons 52 in a channel is connected to the population of striatum neurons 52 in every other channel by synapses 60.

Reward neurons 54 receive input from environmental inputs 62, which may be sensed from the environment. Each channel of reward neurons 54 is coupled to only to the corresponding channel of striatum neurons 52 of which the reward neurons 54 are part of via synapses 64. If the environmental inputs for a channel are positive, the corresponding channel of striatum neurons 52 are rewarded and have their responses reinforced. If the environmental inputs for a channel are negative, the corresponding channel striatum neurons 52 are punished and have their responses attenuated.

Each channel of striatum neurons 52 are connected by synapses 66 only to a corresponding channel of SNr neurons 56. A Poisson random excitatory input 68 is injected into each channel of SNr neurons 56.

The cortex neurons 50, the striatum neurons 52, the reward neurons 54, and the SNr neurons 56 may be modeled by the Leaky-Integrate and Fire (LIF) model defined by equation 1. The synapses 58, 60, 64 and 66 may be modeled by the spike-timing dependent plasticity (STDP) of equation 4.

Learning in these networks is driven by a conditioned stimulus injection. Stereotyped spiking signals may be sent to an input population and all of the reward populations. The timing of the signal is delayed for the target channel so the synaptic learning between the input population and the desired output populations is potentiated, while all other channels are depressed. The timing of these signals are dependent on the values chosen in Equation 4. Punishment signals can be injected by removing the delay from the target reward population and suppressing the activity of the other output populations.

This is only one way of exploiting the architecture of these networks to create arbitrary input/output combinations. Any Hebbian, actor-critic, reward-modulated or distal-reward learning rule can be applied to achieve the same modulation of the synaptic weights.

Similarly, the LIF neuron is only an example of a neural model that can be used. Any mathematical model capable of integrating multiple signals and converting that into discrete time events can be employed in these networks.

Finally, the specific connectivity is not crucial to the performance; increasing the number of connections per cell can improve the stability and plasticity.

Figure 4A:
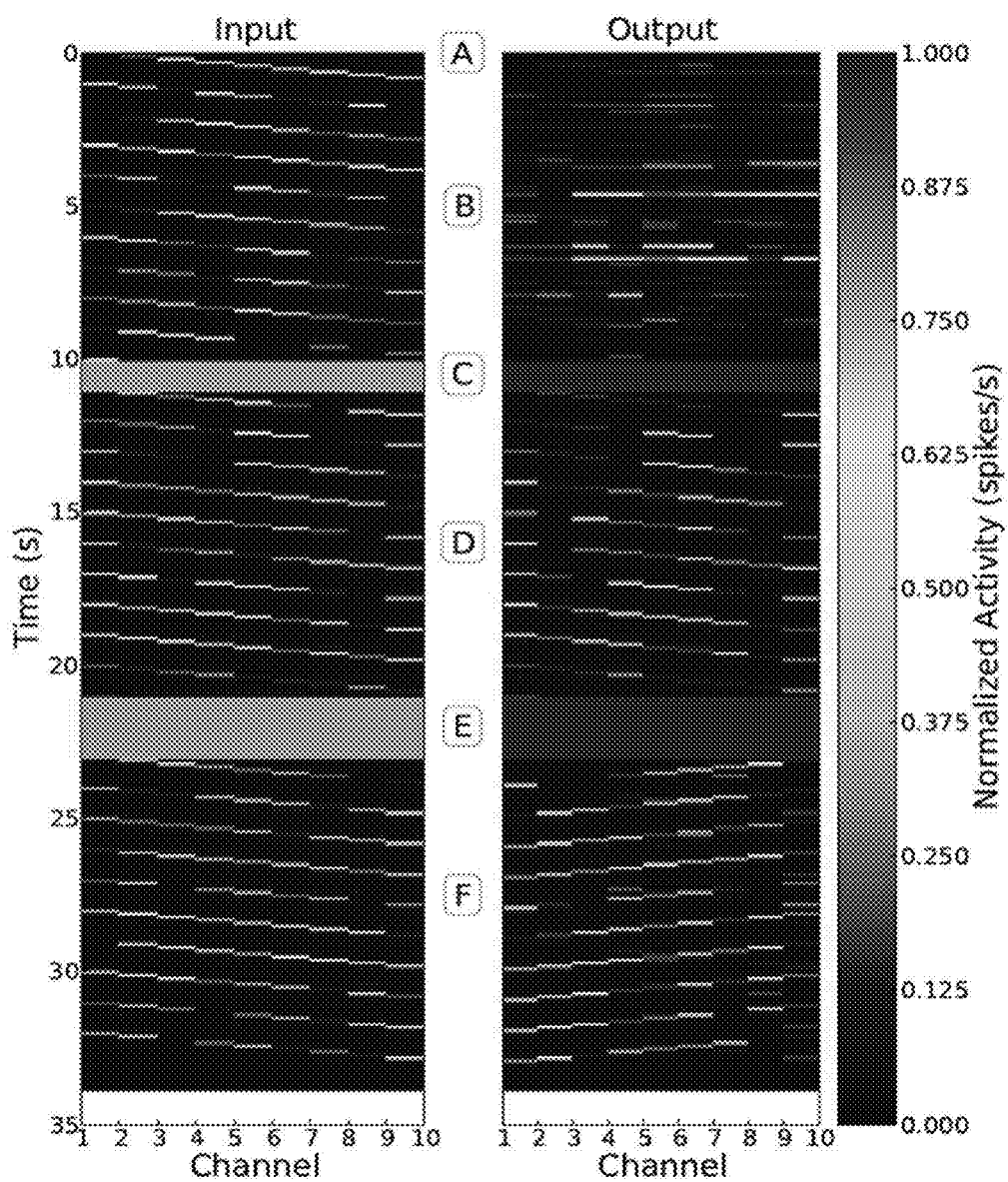
FIGS. 4A, 4B, and 4C show an example of a reward-learning scenario in accordance with the present disclosure.
Figure 4B:
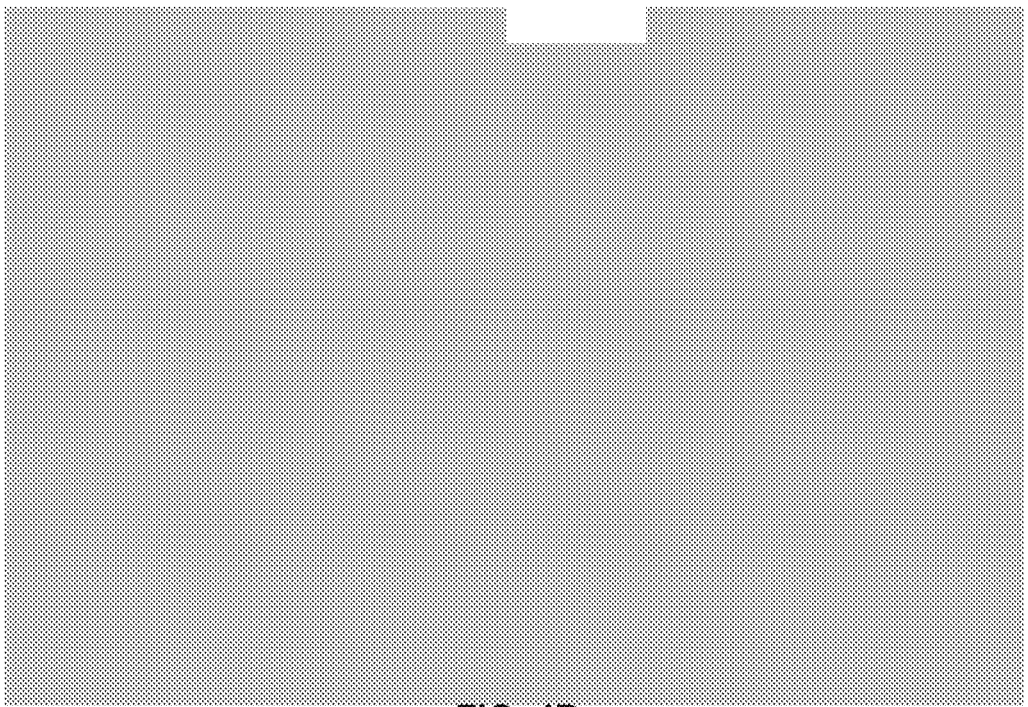
Figure 4C:
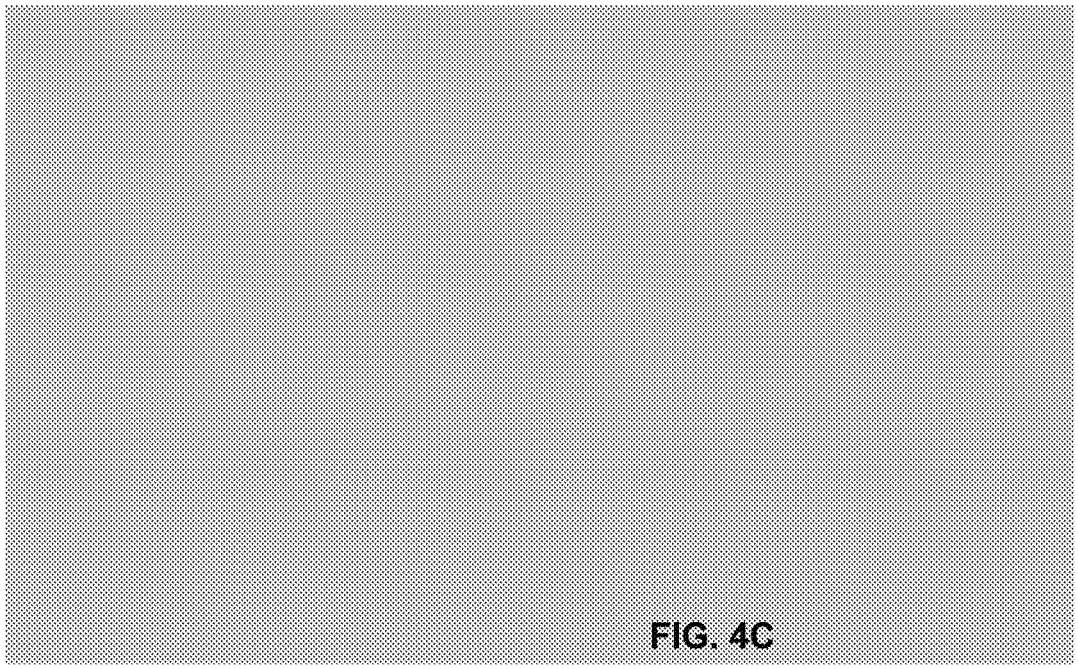

The model of FIG. 1 has been implemented under the constraints of an initial memristor based neuromorphic processor. An example reward-learning scenario is illustrated in FIGS. 4A-4C. FIG. 4A shows an activity rate map of the example scenario. The activity was calculated using a moving Gaussian weighted window. FIG. 4B shows a spike raster of the input populations. FIG. 4C shows a spike raster of the output populations.

The stages are marked by the letters in the center of FIG. 4A. FIGS. 5A-5F show the synaptic weights at 0 sec., 10 sec., 11 sec., 21 sec., 22 sec, and 33 sec., respectively.

Figure 5A:
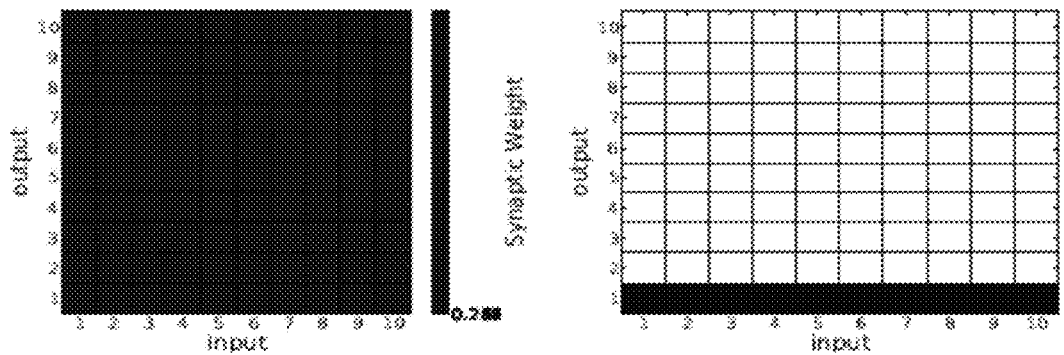
FIGS. 5A, 5B, 5C, 5D, 5E and 5F show an example of synaptic weights for a neural network in accordance with the present disclosure.
Figure 5C:
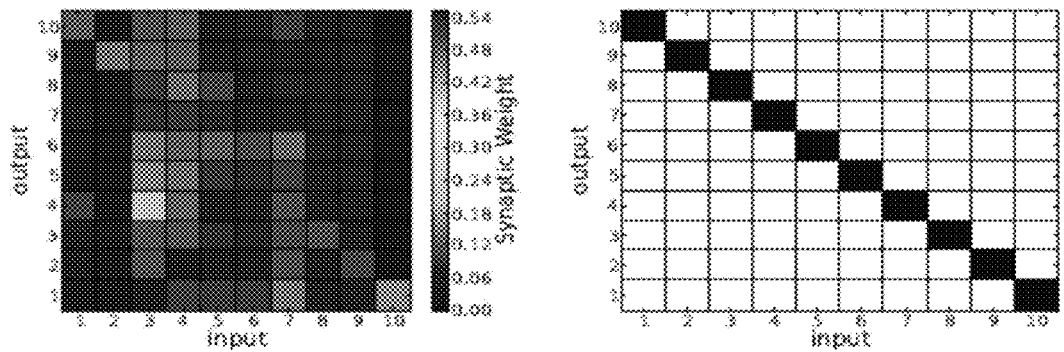

In stage A, the network is initialized with all input/output connections have a synaptic USE value of 0.25; as illustrated in FIG. 5A by the heat map of the average weights between input/output populations.

Figure 5E:
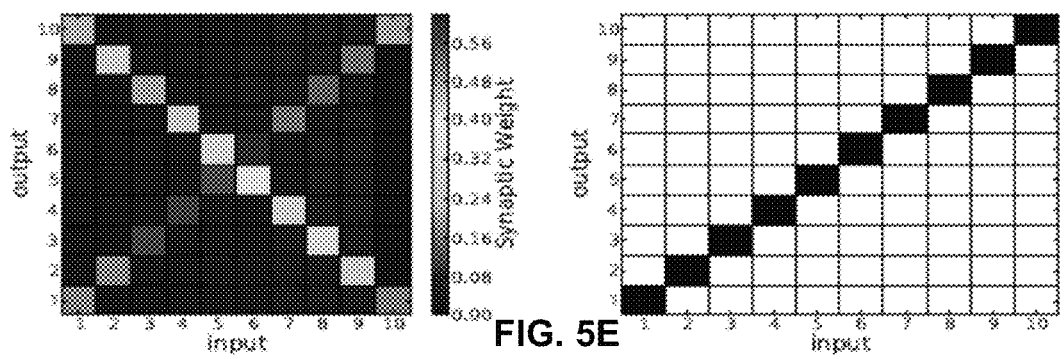
Figure 5B:
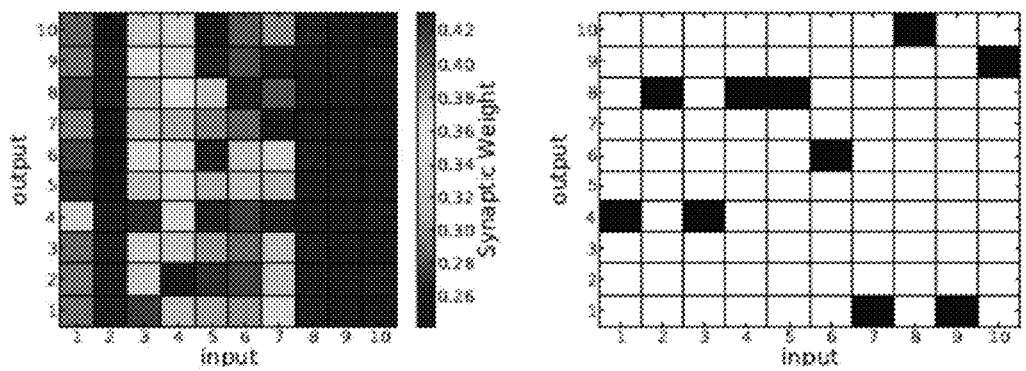
Figure 5D:
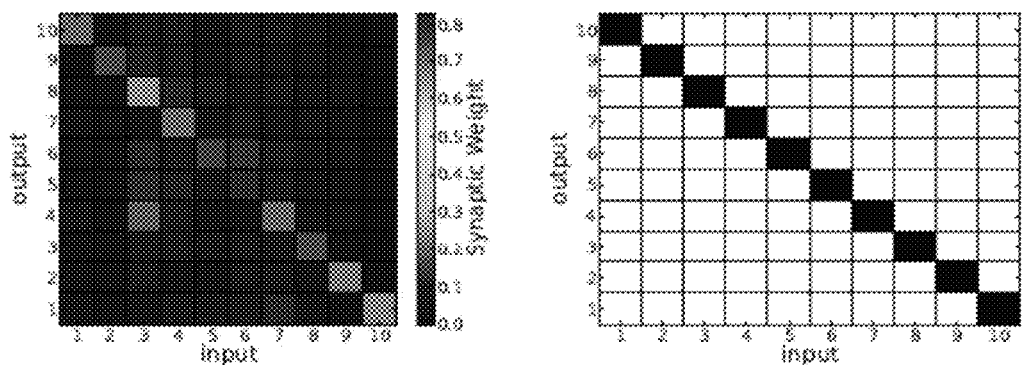

In stage B, a Poisson random input is injected into consecutive channels for 10 seconds to establish the basal activity of the network. The resulting average synaptic weight matrix is shown in FIG. 5B.

In stage C, alternating reward signals are sent to establish single input/output pairs. The weight matrix is now dominated by the diagonal shown in FIG. 5C.

In stage D, the repeated Poisson input signals from B., above, are injected for 10 seconds. After this, the weight matrix shown in FIG. 5D demonstrates further potentiation of the established input/output pairs and a continued depression of the other connections.

In stage E, an opposite set of input/output associations are established using alternating reward signals. For stable retraining of the network the reward protocol needs to be about twice as long as the original training. The new weight matrix is shown in FIG. 5E.

Figure 5F:
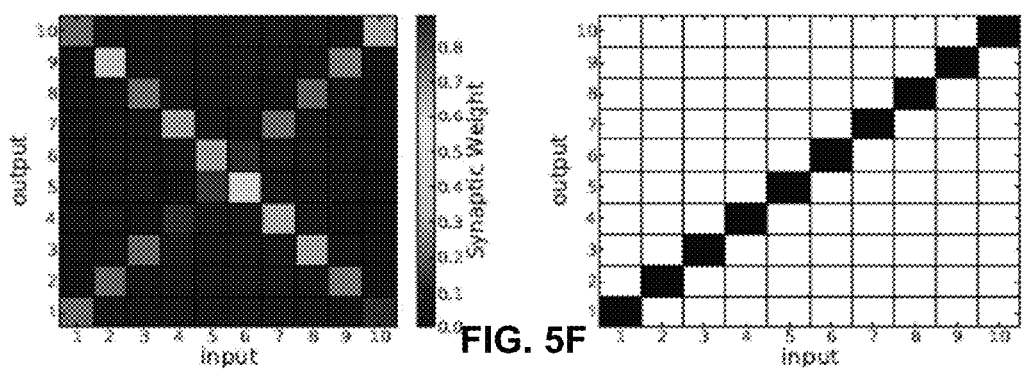

In stage F, 10 seconds of the repeated Poisson inputs illustrate the newly established input/output pairs in FIG. 5F.

To illustrate the lateral inhibition network a pong style virtual environment was implemented. FIG. 6 is a mock-up of that environment. The position of the puck 70 in the game space is sent to a number of discretized neural channels. Each of these channels in essence represents a vertical column of the game board. The inputs are Poisson random spiking events with a rate defined by a Gaussian curve, described below. This provides a noisy input signal with overlap between channels. The networks signal, through a winner-takes-all mechanism, the position of the paddle 72.

Initially, the network has no knowledge or inherent understanding of how to play the game. The behavior is learned through feedback provided as reward and punishment signals encoded as random spike events. The stimulus into the network is determined by the location of the puck 70 to each of the spatial channels. The signal strength for each spatial channel is computed by sampling a Gaussian function based on the location of the channel. The location of the puck 70 on the map determines the peak amplitude and center of a Gaussian function defined as $$fX_c(X^*) = ae^{-((X_c - X^*)^2/2c^2)} \quad (1)$$

where
a is a peak amplitude of the Gaussian function,
b is a center of the Gaussian function,
c is a spatial width of the Gaussian function, and
Xc is the non-dimensional location of the channel.

The peak amplitude and Gaussian center are defined as $$a = Y^* \cdot R_{max} \quad (2)$$

$$b = X^* \quad (3)$$

where
$Y^*$ is the non-dimensional location of the puck in the y dimension,
Rmax is the maximum input stimulus in spikes/s, and
$X^*$ Non-dimensional location of the puck in the x dimension.

Figure 7A:
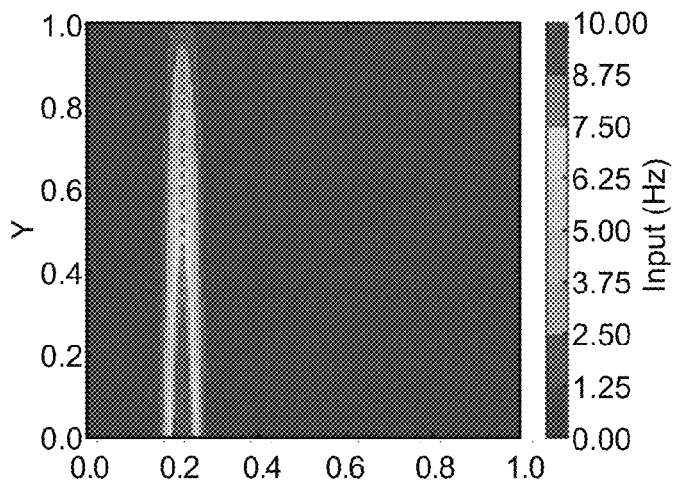
Figure 7B:
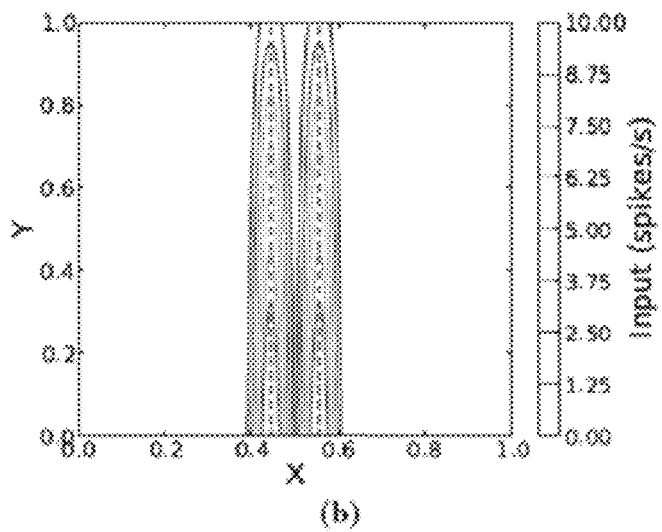
Figure 7C:
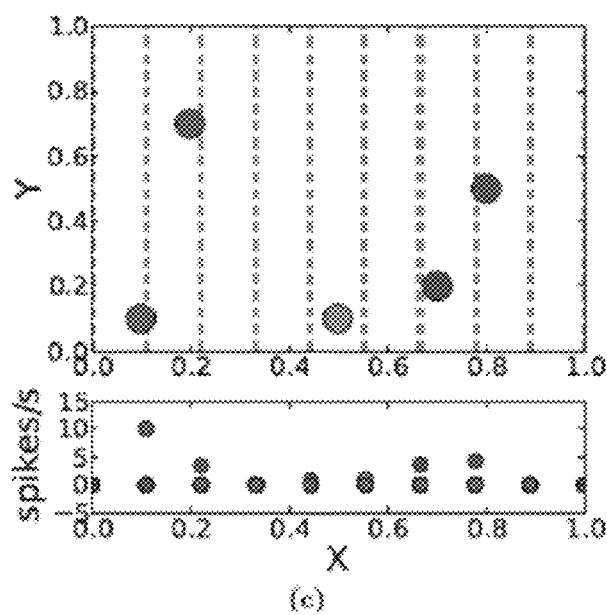
Figure 8A:
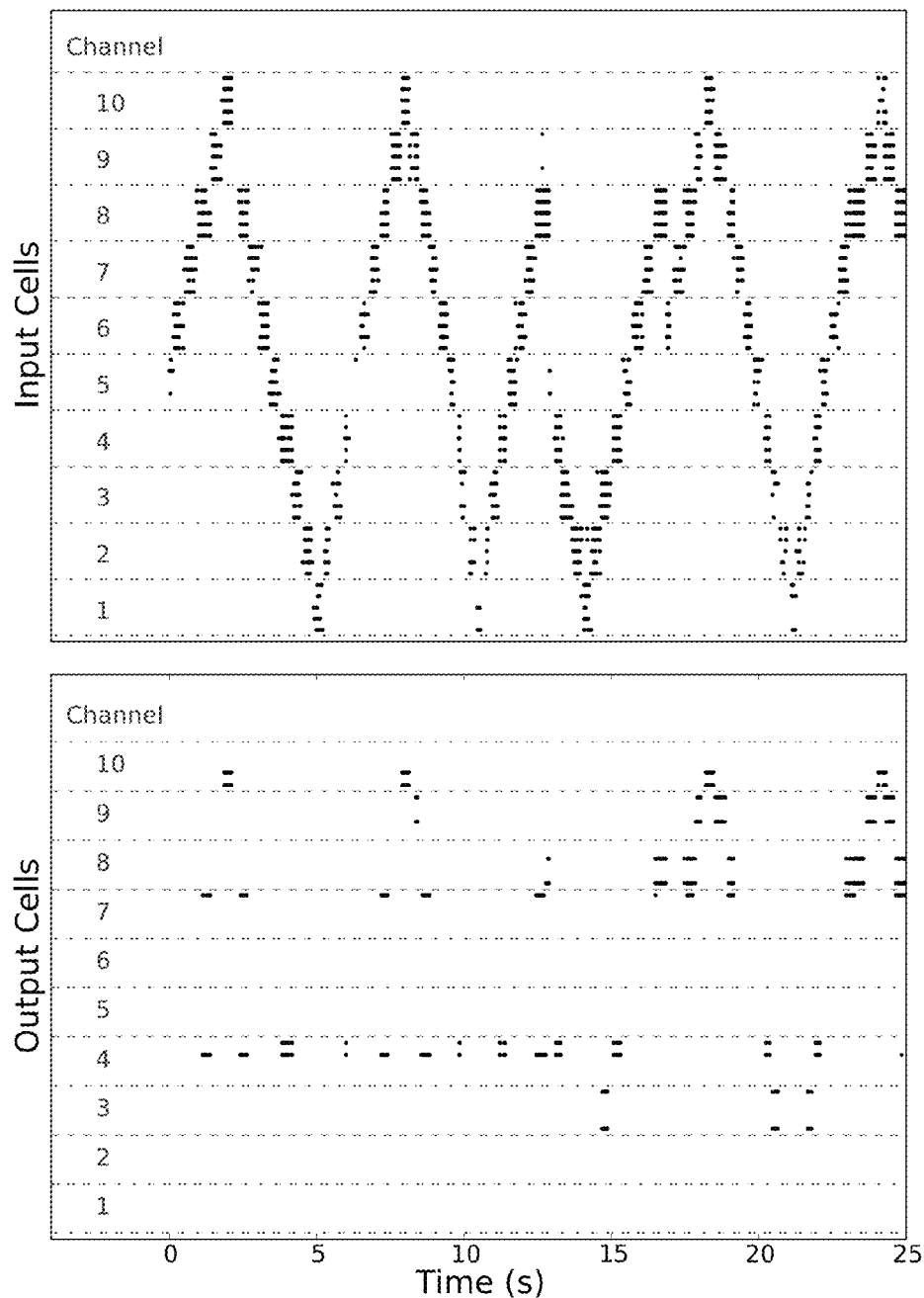
Figure 8B:
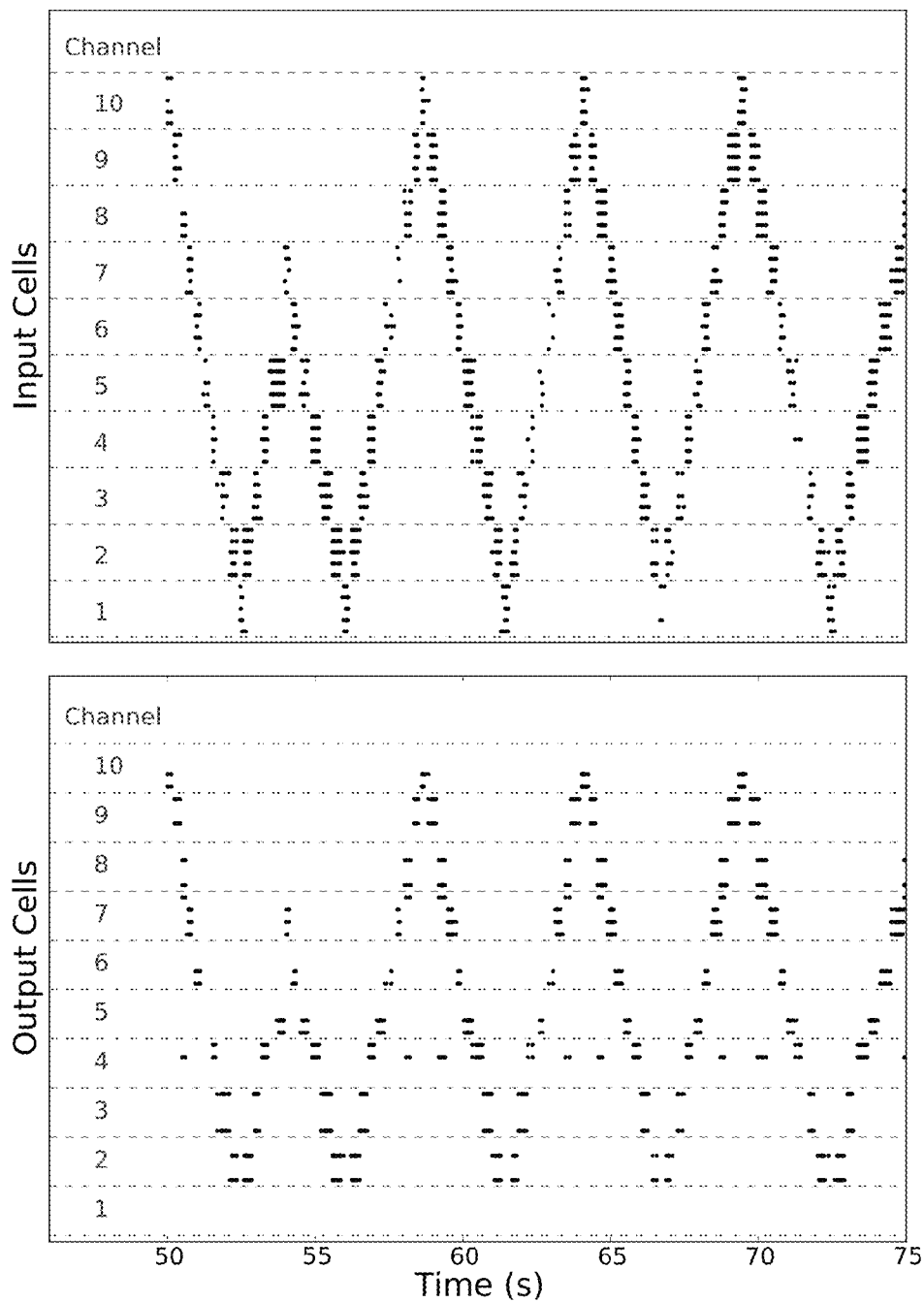
Figure 8C:
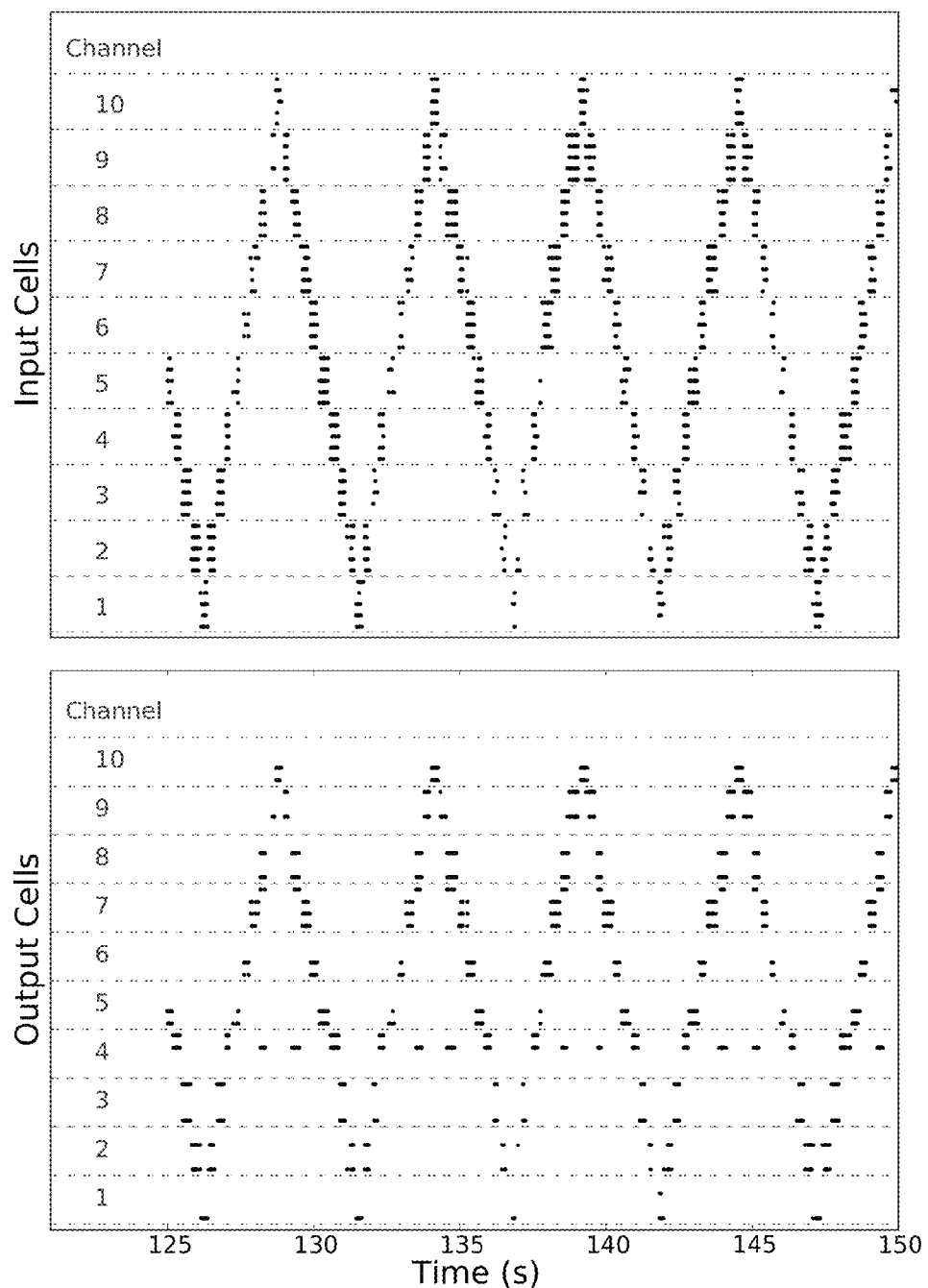

This is visualized in FIGS. 7A, 7B and 7C for a spatial width, c, of 0:05. The reward or punishment to the network arrives when the puck 70 reaches the bottom of the game board 74. FIG. 7A shows an example stimulus map for two spatial channels. FIG. 7B shows a stimulus overlap between two consecutive spatial channels. FIG. 7C shows an example stimulus for different locations of the puck 70.

Figure 10:
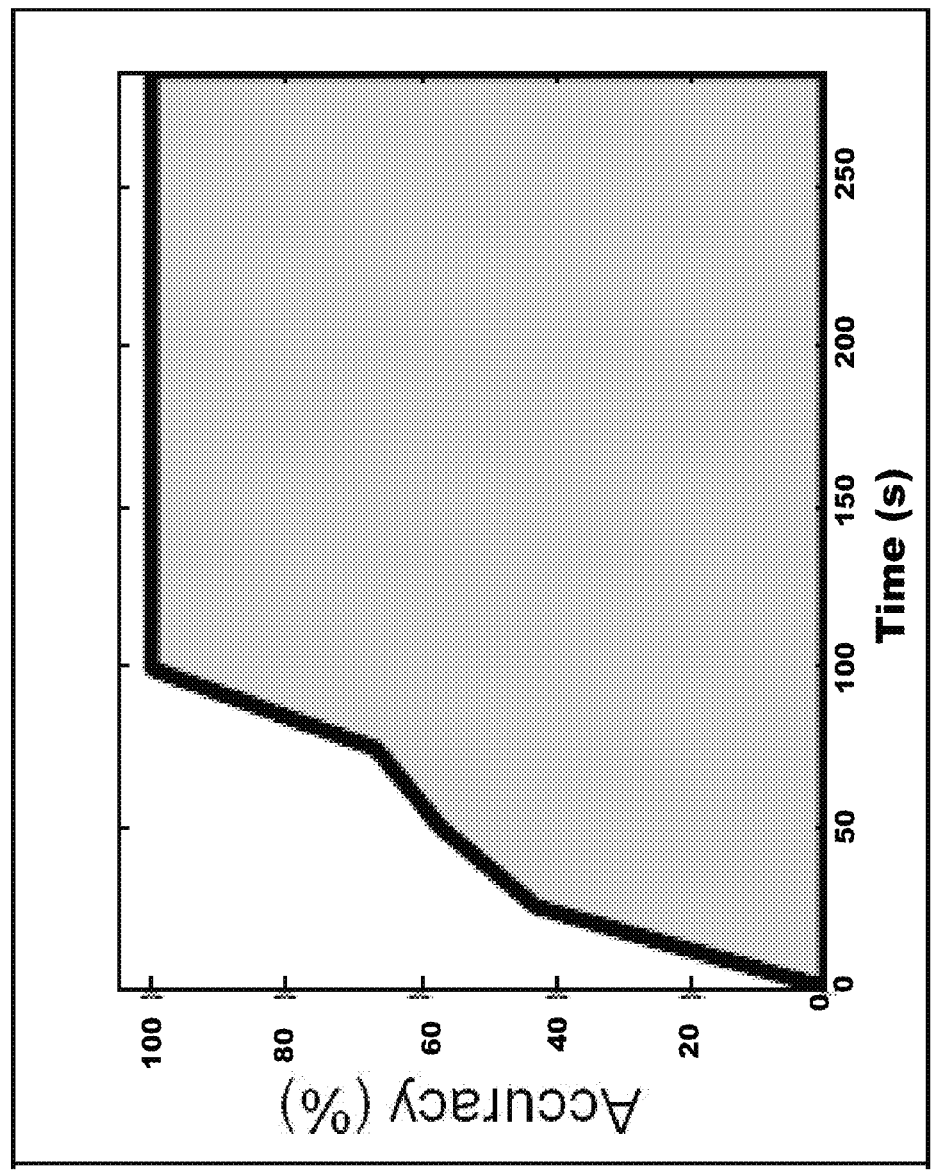
FIG. 10 illustrates the overall accuracy for the model with a spatial width of 0.025 in accordance with the present disclosure.

FIGS. 8A, 8B and 8C, and 9A, 9B, 9C, 9D, 9E, 9F, 9G, 9H, 9I, 9J, 9K and 9L show the results for a spatial width, c, of 0:025 at FIG. 8A 0-25 sec., FIG. 8B 50-75 sec., and FIG. 8C 125-150 sec. FIG. 10 shows the overall accuracy for the model with a spatial width, c, of 0:025.

The neural networks of FIGS. 1-3 may be implemented with passive and active electronics components including transistors, resistors, and capacitors. The neural networks may also be implemented with computers or processors. One type of processor that may be used is a memristor based neuromorphic processor.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

Concepts

This writing discloses at least the following concepts:

Concept 1. A neural model for reinforcement-learning and for action-selection comprising:
- a plurality of channels;
- a population of input neurons in each of the channels;
- a population of output neurons in each of the channels, each population of input neurons in each of the channels coupled to each population of output neurons in each of the channels; and
- a population of reward neurons in each of the channels, wherein each population of reward neurons receives input from an environmental input, and wherein each channel of reward neurons is coupled only to output neurons in a channel that the reward neuron is part of;
- wherein if the environmental input for a channel is positive, the corresponding channel of a population of output neurons are rewarded and have their responses reinforced; and
- wherein if the environmental input for a channel is negative, the corresponding channel of a population of output neurons are punished and have their responses attenuated.

Concept 2. The neural model of Concept 1 wherein each population of output neurons in each of the channels are coupled to each population of input neurons in each of the channels by a synapse having spike-timing dependent plasticity behaving according to $$g_{eff} \rightarrow g_{eff} + g_{effmax} F(\Delta t)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

if $$(g_{eff} < 0)$$

then $$g_{eff} \rightarrow 0$$

if $$(g > g_{effmax})$$

then $$g_{eff} \rightarrow g_{effmax}.$$

Concept 3. The neural model of Concept 1 wherein each population of input neurons, each population of output neurons, and each population of reward neurons are modeled with a Leaky-Integrate and Fire (LIF) model behaving according to $$C_m \frac{dV}{dt} = -g_{leak}(V - E_{rest}) + I.$$

where
- $C_m$ is the membrane capacitance,
- $I$ is the sum of external and synaptic currents,
- $g_{leak}$ conductance of the leak channels, and
- $E_{rest}$ is the reversal potential for that particular class of synapse.

Concept 4. The neural model of Concept 1 wherein the populations of input neurons are connected with equal probability and equal conductance to all of the populations of output neurons.

Concept 5. The neural model of Concept 1 wherein the populations of input neurons are connected randomly to the populations of output neurons.

Concept 6. The neural model of Concept 1 wherein the neural model is implemented with a memristor based neuromorphic processor.

Concept 7. A neural model for reinforcement-learning and for action-selection comprising:
- a plurality of channels;
- a population of input neurons in each of the channels;
- a population of output neurons in each of the channels, each population of input neurons in each of the channels coupled to each population of output neurons in each of the channels;
- a population of reward neurons in each of the channels, wherein each population of reward neurons receives input from an environmental input, and wherein each channel of reward neurons is coupled only to output neurons in a channel that the reward neuron is part of; and
- a population of inhibition neurons in each of the channels, wherein each population of inhibition neurons receive an input from a population of output neurons in a same channel that the population of inhibition neurons is part of, and wherein a population of inhibition neurons in a channel has an output to output neurons in every other channel except the channel of which the inhibition neurons are part of;
- wherein if the environmental input to a population of reward neurons for a channel is positive, the corresponding channel of a population of output neurons are rewarded and have their responses reinforced; and
- wherein if the environmental input to a population of reward neurons for a channel is negative, the corresponding channel of a population of output neurons are punished and have their responses attenuated.

Concept 8. The neural model of Concept 7 wherein:
- each population of output neurons in each of the channels are coupled to each population of input neurons in each of the channels by a synapse having spike-timing dependent plasticity;
- each channel of reward neurons is coupled to output neurons by a synapse having spike-timing dependent plasticity;
- the input to each population of inhibition neurons from a population of output neurons in a same channel that the population of inhibition neurons is part of is by a synapse having spike-timing dependent plasticity; and
- the output from each population of inhibition neurons in a channel is coupled to output neurons in every other channel except the channel of which the inhibition neurons are part of by a synapse having spike-timing dependent plasticity;
- wherein the spike-timing dependent plasticity of each synapse behaves according to $$g_{eff} \rightarrow g_{eff} + g_{effmax} F(\Delta t)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

if $(g_{eff} < 0)$ then $g_{eff} \rightarrow 0$ if $(g > g_{effmax})$ then $g_{eff} \rightarrow g_{effmax}.$ Concept 9. The neural model of Concept 7 wherein each population of input neurons, each population of output neurons, each population of reward neurons, and each population of inhibition neurons are modeled with a Leaky-Integrate and Fire (LIF) model behaving according to $$C_m \frac{dV}{dt} = -g_{leak}(V - E_{rest}) + I.$$

where
Cm is the membrane capacitance,
I is the sum of external and synaptic currents,
gleak conductance of the leak channels, and
Erest is the reversal potential for that particular class of synapse.

Concept 10. The neural model of Concept 7 wherein the populations of input neurons are connected with equal probability and equal conductance to all of the populations of output neurons.

Concept 11. The neural model of Concept 7 wherein the populations of input neurons are connected randomly to the populations of output neurons.

Concept 12. The neural model of Concept 7 wherein as a response increases from output neurons of a channel of which a population of inhibition neurons is part of, the inhibition neurons inhibit the responses from populations of output neurons in every other channel.

Concept 13. The neural model of Concept 7 wherein the neural model is implemented with a memristor based neuromorphic processor.

Concept 14. A basal ganglia neural network model comprising:
a plurality of channels;
a population of cortex neurons in each of the channels;
a population of striatum neurons in each of the channels, each population of striatum neurons in each of the channels coupled to each population of cortex neurons in each of the channels;
a population of reward neurons in each of the channels, wherein each population of reward neurons receives input from an environmental input, and wherein each channel of reward neurons is coupled only to striatum neurons in a channel that the reward neuron is part of; and
a population of Substantia Nigra pars reticulata (SNr) neurons in each of the channels, wherein each population of SNr neurons is coupled only to a population of striatum neurons in a channel that the SNr neurons are part of;
wherein if the environmental input to a population of reward neurons for a channel is positive, the corresponding channel of a population of striatum neurons are rewarded and have their responses reinforced;
wherein if the environmental input to a population of reward neurons for a channel is negative, the corresponding channel of a population of striatum neurons are punished and have their responses attenuated; and
wherein each population of SNr neurons is tonically active and is suppressed by inhibitory afferents of striatum neurons in a channel that the SNr neurons are part of.

Concept 15. The basal ganglia neural network model of Concept 14 wherein:
each population of cortex neurons in each of the channels are coupled to each population of striatum neurons in each of the channels by a synapse having spike-timing dependent plasticity;
each population of striatum neurons in a channel are coupled to striatum neurons in every other channel by a synapse having spike-timing dependent plasticity;
each channel of reward neurons is coupled to a population of striatum neurons in a same channel by a synapse having spike-timing dependent plasticity;
each population of SNr neurons is coupled to a population of striatum neurons in a same channel that the population of SNr neurons is part of by a synapse having spike-timing dependent plasticity; and
wherein the spike-timing dependent plasticity of each synapse behaves according to $$g_{eff} \rightarrow g_{eff} + g_{effmax} F(\Delta t)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

if $(g_{eff} < 0)$ then $g_{eff} \rightarrow 0$ if $(g > g_{effmax})$ then $g_{eff} \rightarrow g_{effmax}.$ Concept 16. The basal ganglia neural network model of Concept 14 wherein each population of cortex neurons, each population of striatum neurons, each population of reward neurons, and each population of SNr neurons are modeled with a Leaky-Integrate and Fire (LIF) model behaving according to $$C_m \frac{dV}{dt} = -g_{leak}(V - E_{rest}) + I.$$

where

Cm is the membrane capacitance,

I is the sum of external and synaptic currents, gleak conductance of the leak channels, and Erest is the reversal potential for that particular class of synapse.

Concept 17. The basal ganglia neural network model of Concept 14 wherein the populations of cortex neurons are connected with equal probability and equal conductance to all of the populations of striatum neurons.

Concept 18. The basal ganglia neural network model of Concept 14 wherein the populations of cortex neurons are connected randomly to the populations of striatum neurons.

Concept 19. The basal ganglia neural network model of Concept 14 wherein a Poisson random excitation is injected into the populations of SNr neurons.

Concept 20. The basal ganglia neural network model of Concept 14 wherein uniform random noise is injected into the populations of SNr neurons.

Concept 21. The basal ganglia neural network model of Concept 14 wherein the basal ganglia neural network model is implemented with a memristor based neuromorphic processor.

What is claimed is:

1. A neural network for reinforcement-learning and for action-selection comprising:
    a plurality of channels;
    a population of input neurons in each of the channels;
    a population of output neurons in each of the channels, each population of input neurons in each of the channels coupled to each population of output neurons in each of the channels by first synapses; and
    a population of reward neurons in each of the channels, wherein each population of reward neurons receives input from an environmental input, and wherein each channel of reward neurons is coupled only to output neurons in a channel that the reward neuron is part of by second synapses;
    wherein if the environmental input for a channel is positive, the corresponding channel of a population of output neurons are rewarded and have their responses reinforced;
    wherein if the environmental input for a channel is negative, the corresponding channel of a population of output neurons are punished and have their responses attenuated; and
    wherein the neural network comprises memristors.

2. The neural network of claim 1 wherein the first synapses and the second synapses have a spike-timing dependent plasticity wherein $$g_{syn} = g_{max} \cdot g_{eff} \cdot (V - E_{syn})$$

where
    gmax is a maximum conductance of the first and second synapses,
    geff is a current synaptic efficacy between 0 and a maximum value of geffmax,
    Esyn is a reversal potential for the first and second synapses, V is a voltage, and
gsyn is a synapse conductance.

3. The neural network of claim 2 wherein $$g_{eff} \rightarrow g_{eff} + g_{effmax} F(\Delta t)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

if $(g_{eff} < 0)$ then $g_{eff} \rightarrow 0$ if $(geff > geffmax)$ then $geff \rightarrow geffmax$.

4. The neural network of claim 1 wherein each population of input neurons, each population of output neurons, and each population of reward neurons comprise a Leaky-Integrate and Fire (LIF) device wherein $$C_m \frac{dV}{dt} = -g_{leak}(V - E_{rest}) + I$$

where
    Cm is a membrane capacitance,
    I is a sum of external and synaptic currents,
    gleak is a conductance of the leak channels, and
    Erest is a reversal potential for that particular class of synapse.

5. The neural network of claim 1 wherein the populations of input neurons are connected with equal probability and equal conductance to all of the populations of output neurons.

6. The neural network of claim 1 wherein the populations of input neurons are connected randomly to the populations of output neurons.

7. The neural network of claim 1 wherein the neural network comprises a memristor based neuromorphic processor, passive and active components comprising transistors, resistors and capacitors, a computer, or a processor.

8. A neural network for reinforcement-learning and for action-selection comprising:
    a plurality of channels;
    a population of input neurons in each of the channels;
    a population of output neurons in each of the channels, each population of input neurons in each of the channels coupled to each population of output neurons in each of the channels by first synapses;
    a population of reward neurons in each of the channels, wherein each population of reward neurons receives input from an environmental input, and wherein each channel of reward neurons is coupled only to output neurons in a channel that the reward neuron is part of by second synapses; and a population of inhibition neurons in each of the channels, wherein each population of inhibition neurons is coupled by third synapses and receives an input from a population of output neurons in a same channel that the population of inhibition neurons is part of, and wherein a population of inhibition neurons in a channel is coupled by fourth synapses and has an output to output neurons in every other channel except the channel of which the inhibition neurons are part of;

wherein if the environmental input to a population of reward neurons for a channel is positive, the corresponding channel of a population of output neurons are rewarded and have their responses reinforced;

wherein if the environmental input to a population of reward neurons for a channel is negative, the corresponding channel of a population of output neurons are punished and have their responses attenuated; and wherein the neural network comprises memristors.

9. The neural network of claim 8 wherein the first synapses, the second synapses, third synapses, and the fourth synapses have a spike-timing dependent plasticity wherein $$g_{syn} = g_{max} \cdot g_{eff} \cdot (V - E_{syn})$$

where
gmax is a maximum conductance of the first and second synapses,
geff is a current synaptic efficacy between 0 and a maximum value of geffmax,
Esyn is a reversal potential for the first and second synapses,
V is a voltage, and
gsyn is a synapse conductance.

10. The neural network of claim 9 wherein:

$$g_{eff} \rightarrow g_{eff} + g_{effmax} F(\Delta t)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

if $(g_{eff} < 0)$ then $g_{eff} \rightarrow 0$ if $(geff > geffmax)$ then $geff \rightarrow geffmax.$ 11. The neural network of claim 8 wherein each population of input neurons, each population of output neurons, each population of reward neurons, and each population of inhibition neurons comprise a Leaky-Integrate and Fire (LIF) device wherein $$C_m \frac{dV}{dt} = -g_{leak}(V - E_{rest}) + I$$

where
Cm is a membrane capacitance,
I is a sum of external and synaptic currents,
gleak is a conductance of the leak channels, and
Erest is a reversal potential for that particular class of synapse.

12. The neural network of claim 8 wherein the populations of input neurons are connected with equal probability and equal conductance to all of the populations of output neurons.

13. The neural network of claim 8 wherein the populations of input neurons are connected randomly to the populations of output neurons.

14. The neural network of claim 8 wherein as a response increases from output neurons of a channel of which a population of inhibition neurons is part of, the inhibition neurons inhibit the responses from populations of output neurons in every other channel.

15. The neural network of claim 8 wherein the neural network comprises a memristor based neuromorphic processor, passive and active components comprising transistors, resistors and capacitors, a computer, or a processor.

16. A basal ganglia neural network comprising:
a plurality of channels;
a population of cortex neurons in each of the channels;
a population of striatum neurons in each of the channels, each population of striatum neurons in each of the channels coupled to each population of cortex neurons in each of the channels by first synapses;
a population of reward neurons in each of the channels, wherein each population of reward neurons receives input from an environmental input, and wherein each channel of reward neurons is coupled by second synapses only to striatum neurons in a channel that the reward neuron is part of; and
a population of Substantia Nigra pars reticulata (SNr) neurons in each of the channels, wherein each population of SNr neurons is coupled by third synapses only to a population of striatum neurons in a channel that the SNr neurons are part of;
wherein if the environmental input to a population of reward neurons for a channel is positive, the corresponding channel of a population of striatum neurons are rewarded and have their responses reinforced;
wherein if the environmental input to a population of reward neurons for a channel is negative, the corresponding channel of a population of striatum neurons are punished and have their responses attenuated;
wherein each population of SNr neurons is tonically active and is suppressed by inhibitory afferents of striatum neurons in a channel that the SNr neurons are part of; and
wherein the basal ganglia neural network comprises memristors.

17. The neural network of claim 16 wherein the first synapses, the second synapses, and the third synapses have a spike-timing dependent plasticity wherein $$g_{syn} = g_{max} \cdot g_{eff} \cdot (V - E_{syn})$$

where
gmax is a maximum conductance of the first and second synapses,
geff is a current synaptic efficacy between 0 and a maximum value of geffmax,
Esyn is a reversal potential for the first and second synapses,
V is a voltage, and
gsyn is a synapse conductance.

18. The basal ganglia neural network of claim 17 wherein:

$$g_{eff} \rightarrow g_{eff} + g_{effmax} F(\Delta t)$$

where $$\Delta t = t_{pre} - t_{post}$$

$$F(\Delta t) = \begin{cases} A_+ e^{\left(\frac{\Delta t}{\tau_+}\right)} \\ A_- e^{\left(\frac{\Delta t}{\tau_-}\right)} \end{cases}$$

if $$(g_{eff} < 0)$$

then $$g_{eff} \rightarrow 0$$

if $$(geff > geffmax)$$

then $$geff \rightarrow geffmax.$$

19. The basal ganglia neural network of claim 16 wherein each population of cortex neurons, each population of striatum neurons, each population of reward neurons, and each population of SNr neurons comprise a Leaky-Integrate and Fire (LIF) device wherein $$C_m \frac{dV}{dt} = -g_{leak}(V - E_{rest}) + I$$

where
- Cm is a membrane capacitance,
- I is a sum of external and synaptic currents,
- gleak is a conductance of the leak channels, and
- Erest is a reversal potential for that particular class of synapse.

20. The basal ganglia neural network of claim 16 wherein the populations of cortex neurons are connected with equal probability and equal conductance to all of the populations of striatum neurons.

21. The basal ganglia neural network of claim 16 wherein the populations of cortex neurons are connected randomly to the populations of striatum neurons.

22. The basal ganglia neural network of claim 16 wherein a Poisson random excitation is injected into the populations of SNr neurons.

23. The basal ganglia neural network of claim 16 wherein uniform random noise is injected into the populations of SNr neurons.

24. The basal ganglia neural network of claim 16 wherein the basal ganglia neural network comprises a memristor based neuromorphic processor, passive and active components comprising transistors, resistors and capacitors, a computer, or a processor.

* * * * *